US008315753B2

(12) United States Patent
Meyer

(10) Patent No.: US 8,315,753 B2
(45) Date of Patent: Nov. 20, 2012

(54) WHEELCHAIR CONTROL SYSTEM

(75) Inventor: Steven M. Meyer, Georgetown, TX (US)

(73) Assignee: Texas Instruments Incorporated, Dallas, TX (US)

( * ) Notice: Subject to any disclaimer, the term of this patent is extended or adjusted under 35 U.S.C. 154(b) by 398 days.

(21) Appl. No.: 12/683,960

(22) Filed: Jan. 7, 2010

(65) Prior Publication Data

US 2010/0174432 A1 Jul. 8, 2010

Related U.S. Application Data

(60) Provisional application No. 61/142,983, filed on Jan. 7, 2009.

(51) Int. Cl.
*B60L 9/00* (2006.01)

(52) U.S. Cl. ............... 701/22; 701/79; 701/93; 180/6.5; 180/65.51; 180/65.8; 180/907; 280/250.1

(58) Field of Classification Search .................... 701/22, 701/48, 70, 72, 79, 93; 180/6.5, 65.8, 65.51, 180/907; 280/250.1, 755; 340/686.1
See application file for complete search history.

(56) References Cited

U.S. PATENT DOCUMENTS

| | | | | |
|---|---|---|---|---|
| 5,497,056 | A * | 3/1996 | Kurland et al. | 318/269 |
| 6,047,980 | A * | 4/2000 | Margherita et al. | 280/250.1 |
| 2001/0006125 | A1* | 7/2001 | Richey et al. | 180/6.5 |
| 2007/0063475 | A1* | 3/2007 | de Kruijf | 280/250.1 |
| 2010/0138128 | A1* | 6/2010 | Strothmann et al. | 701/72 |

* cited by examiner

*Primary Examiner* — Gertrude Arthur Jeanglaude
(74) *Attorney, Agent, or Firm* — Robert D. Marshall, Jr.; Wade James Brady, III; Frederick J. Telecky, Jr.

(57) ABSTRACT

A method and apparatus for wheelchair control. The position and distance of a touch point on a touch pad is used to set speed and wheel differential control. The two major wheels of the wheelchair are controlled according to these set quantities. Exceeding either of two horizontal accelerations measured by an accelerometer limits the set speed. Wheelchair control is shut down upon exceeding a vertical acceleration limit.

7 Claims, 2 Drawing Sheets

WHEELCHAIR CONTROL SYSTEM

CLAIM OF PRIORITY

This application claims priority under 35 U.S.C. 119(e)(1) to U.S. Provisional Application No. 61/142,983 filed Jan. 7, 2009.

TECHNICAL FIELD OF THE INVENTION

The technical field of this invention is wheelchair control systems.

BACKGROUND OF THE INVENTION

The Wheelchair Control System includes two electric motors and associated drive electronics used in powering electric wheelchairs. The motors can be of any technology. Brush DC motors and brushless DC motors are preferred. An input, such as a touch pad or a touch screen used as a user interface, permits entry of commands controlling speed and direction.

SUMMARY OF THE INVENTION

This disclosure describes a wheelchair control system that includes the following: a first electric motor with a first power drive electronics; a second electric motor with a second power drive electronics; a power supply coupled to the first and second power drive electronics; a microcontroller coupled to the power supply and the first and second power drive electronics; and an input device coupled to the controller.

The wheelchair control system may further include an accelerometer and or an electronic differential. The wheelchair control system may provide for a touch screen interface as the input device.

BRIEF DESCRIPTION OF THE DRAWINGS

These and other aspects of this invention are illustrated in the drawings, in which.

DETAILED DESCRIPTION OF PREFERRED EMBODIMENTS

The present invention is a method and apparatus for wheelchair control. This disclosure describes numerous specific details in order to provide a thorough understanding of the present invention. One skilled in the art will appreciate that one may practice the present invention without these specific details. Additionally, this disclosure does not describe some well known items in detail in order not to obscure the present invention.

Figure 1:
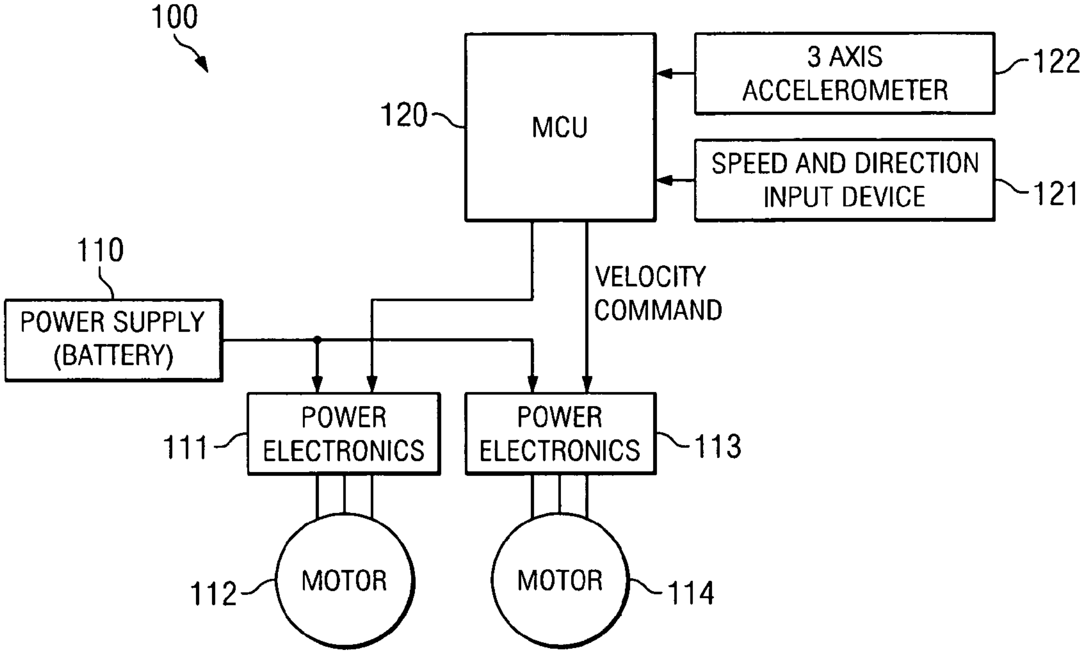
FIG. 1 is a block diagram of the circuitry of this invention.

FIG. 1 is a block diagram of the hardware of this invention. Power supply 110 supplied motive power to the system. In the wheelchair control system of this invention the power supply is preferably a battery mounted on the wheelchair. Power supply 110 supplies electric power to power electronics 111 and 113. Power electronics 111 drives motor 112 on one major wheel of the wheelchair. Power electronics 113 drives motor 114 on the other major wheel. Microcontroller unit (MCU) 120 supplies velocity command signals to power electronics 111 and 113 to control motor drive. Speed and direction input device 121 supplied inputs to MCU 120. Three axis accelerometer 122 supplies acceleration signals to MCU 120. MCU 120 uses inputs from speed and direction input device 121 and three axis accelerometer 122 to calculate velocity commands for control of wheelchair motion.

Speed and direction input device 121 is preferably a touch pad and more preferably a touch screen interface. A touch pad with pre-installed software that can interpret a touch command in terms of a Cartesian location on the pad that would provide a two axis input to MCU 120. A pad that has a center point can detect a contact from the user, either by touch or with a stylus, and orient from the center of the pad an output proportional to the desired speed and direction, and send that command digitally to MCU 120.

Figure 2:
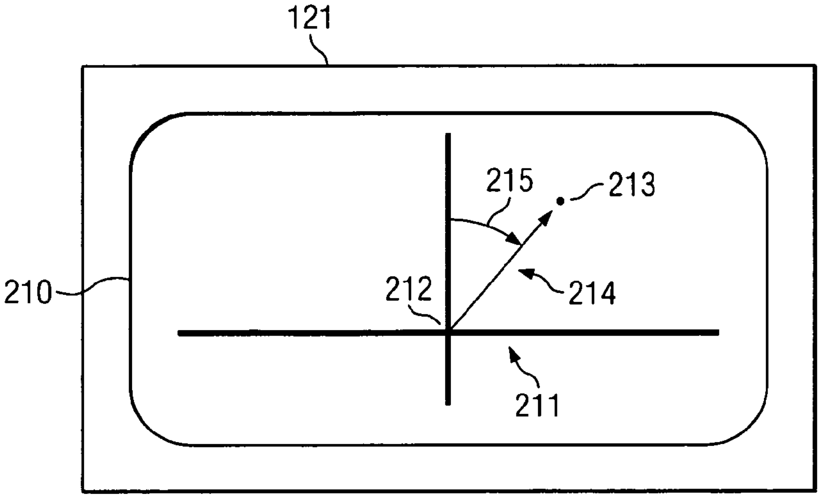
FIG. 2 is a detail of the speed and direction input device of this invention.

FIG. 2 illustrates an example touch screen suitable as speed and direction input device 121. Speed and direction input device 121 includes screen 210 which is both an input device and an output device. Screen 210 preferably includes orientation lines 211. Orientation lines 211 intersect at origin point 212. If speed and direction device 121 is embodied by a touch pad, then orientation lines 211 can be permanently imprinted on the touch pad. If speed and direction device 121 is embodied by a touch screen, then orientation lines 211 can be temporarily shown on the display screen via control signals from MCU 120. Origin point 212 serves as a reference point for the speed and direction input. Touch point 213 indicates a point on screen 210 currently touched by a finger or stylus. Touch point 213 is related to origin point 212 by a vector 214 having a distance and an angle 215 ($\theta$).

This invention provides a wheelchair control system with an electronic differential. The relative speed of the two rear wheels of a car must vary in order for the vehicle to turn around corners. Similarly varying the speed electronically is required for an electrically powered wheelchair to turn.

A steering wheel in a car is used to mechanically adjust the angle of the front wheels in order to direct the motion of the car to turn at a desired radius. A steering command signal can be created which causes a voltage to be sensed that is proportional to the angle of the steering wheel. Zero could be oriented as straight ahead and if the scale of the voltage is that 100% turn to one direction is 5 volts then any value up to that limit will be a proportion of the desired turning ratio. If a plus voltage scale means turn to the right and a negative voltage scale is turn to the left, then a direction command can be easily interpreted from any input value between +5 volts and −5 volts. Another implementation might have a scale of 5 volts total with 2.5 volts being the midpoint with zero value to the right or left. In this second method, 3 volts would be 20% to the right and cause the velocity command to the motors to decrease the right motor speed by 20%. In either case the result is the same, steering of the wheelchair is created by changing the relative velocity of the two wheels.

The wheel speed is then proportioned so that in addition to the speed command as a forward or reverse speed to the two wheels, the turning proportion can be imparted at the same time to the left and right wheel. So for a value of +2V, turning 40% to the right, the control system would decrease the velocity of the right hand motor by 40%.

Figure 3:
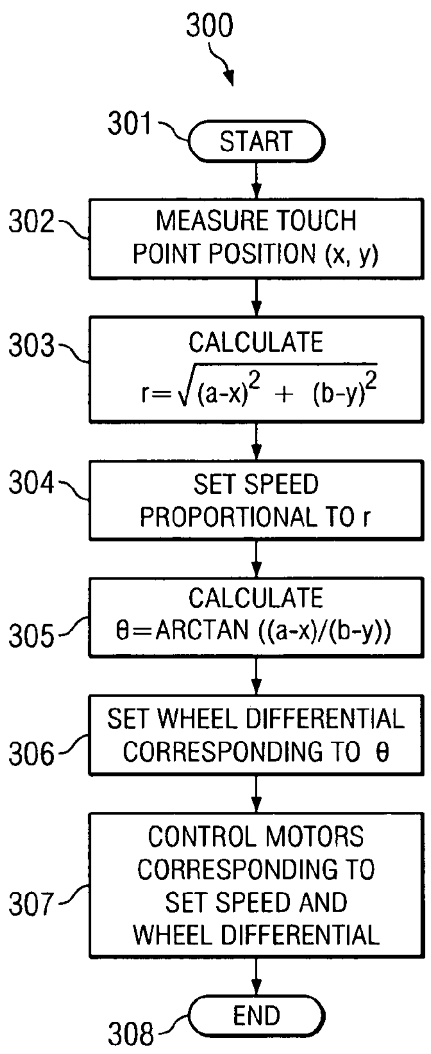
FIG. 3 is a flow chart of a program part running on the microcontroller unit illustrated in FIG. 1 for producing motor control commands according to inputs read by the speed and direction input device illustrated in FIG. 2.

FIG. 3 illustrates program part 300 of this invention. Program part 300 is a part of the application software running on MCU 300. MCU 300 will execute program part 300 periodically and repetitively in wheelchair control. Program part 300 selects the wheel drive corresponding to inputs receives at speed and direction input device 121.

Program part 300 begins with start block 301. Block 302 measures the current touch point of speed and direction input device 121. In this embodiment the current touch point is indicated by Cartesian coordinates (x,y).

Block 303 calculates the distance of vector 214. In this example the origin point 212 has the Cartesian coordinates (a,b). The distance r is thus $\sqrt{(a-x)^2-(b-y)^2}$. Block 304 sets the speed of control of the wheelchair wheels proportional to r.

Block 305 calculates the angle θ 215. In this example the angle θ is $$\arctan\left(\frac{(a-x)}{b-y}\right).$$

Block 306 sets the differential drive supplied to the two wheels via power electronics 111 and 113 and motors 112 and 114 corresponding to this computed angle θ.

Block 307 controls motors 112 and 113 via corresponding velocity control signals corresponding to the selected speed and velocity differential. This process is described above. Program part 300 ends with end block 308.

This invention uses an accelerometer as part of the wheelchair control system. Inclusion of an accelerometer creates the ability to operate with a closed loop input. Two axes of the accelerometer correspond exactly to the two axes of motion in the wheelchair. The presence of a sensor input that can directly measure velocity makes possible software that is capable of determining conditions that do not correspond to the commanded inputs. In addition, because the sensor can detect acceleration directly, acceleration limits can be programmed or under program control.

The presence of a third axis in the sensor offers the potential to sense when the stability of the wheelchair is compromised.

Figure 4:
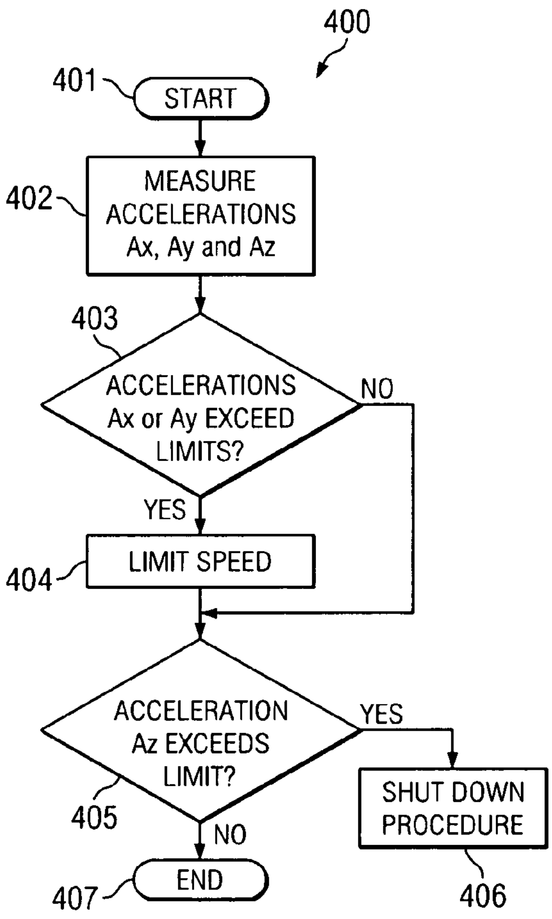
FIG. 4 is a flow chart of a program part running on the microcontroller unit illustrated in FIG. 1 using accelerometer inputs for motor control.

FIG. 4 illustrates program part 400 of this invention. Program part 400 is a part of the application software running on MCU 300. MCU 400 will execute program part 400 periodically and repetitively in wheelchair control. Program part 400 modifies the wheel drive generated by program part 300 according to acceleration signals from three axis accelerometer.

Program part 400 begins with start block 301. Block 402 measures the three axis accelerations Ax, Ay and Az. In this embodiment Ax and Ay are horizontal accelerations and Az is the vertical acceleration.

Decision block 403 determines whether accelerations Ax or Ay exceed corresponding predetermined limits. If one or both accelerations Ax and Ay exceed the respective limits (Yes at decision block 403), then block 404 limits the set speed of the control of program part 404. This prevents violent maneuvers in the wheelchair without stopping operations.

If neither accelerations Ax and Ay exceed the respective limits (No at decision block 403) or following block 404, then decision block 405 determines whether acceleration Az exceeds a predetermined limit. If acceleration Az exceeds its limit (Yes at decision block 405), then block 406 shuts down wheelchair control operations. Exceeding the vertical acceleration limit indicates unstable and unsafe operations. The invention preferably stops wheelchair control operations by stopping electric power drive to both motors 112 and 114. If acceleration Az does not exceed its limit (No at decision block 405), then program part 400 ends with end block 708.

This disclosure describes a wheelchair control system that includes the following: a first electric motor with a first power drive electronics; a second electric motor with a second power drive electronics; a power supply that couples to the first and second power drive electronics; a controller that couples to the power supply and the first and second power drive electronics; and an input device coupled to the controller.

Additionally, the wheelchair control system may further include an accelerometer and or an electronic differential. Further, the wheelchair control system may provide for a touch screen interface as the input device.

Other embodiments of the present invention will be apparent to those skilled in the art after considering this disclosure or practicing the disclosed invention. The specification and examples above are exemplary only, with the true scope of the present invention being determined by the following claims.

What is claimed is:

1. A method of motorized wheelchair control comprising the steps of:

receiving a user touch input on a touch pad;

determining a distance of the user touch input from an origin point;

setting a speed for two wheelchair wheels proportional to the determined distance;

determining an angle of the user touch input relative to a reference line;

setting a wheel differential corresponding to the determined angle; and separately controlling wheel speed of two major wheelchair wheels corresponding to the set speed and the set wheel differential.

2. The method of claim 1, further comprising the steps of:

detecting two axis horizontal acceleration of the wheelchair; and limiting the set speed if either access horizontal acceleration exceeds a respective predetermined limit.

3. The method of claim 1, further comprising the steps of:

detecting a vertical acceleration of the wheelchair; and stopping motion of the wheelchair if the vertical horizontal acceleration exceeds a predetermined limit.

4. A wheelchair control system, comprising:

a first electric motor coupled to a first major wheel of the wheelchair;

a first power drive electronics supplying controlled electric power to said first electric motor;

a second electric motor coupled to a second major wheel of the wheelchair;

a second power drive electronics supplying controlled electric power to said second electric motor;

a touch pad input device detecting a user touch point; and a microcontroller unit receiving inputs from the touch pad and supplying respective velocity control signals to said first and second power drive electronics for motor control, said microcontroller unit programmed to determine a distance of the user touch input from an origin point, setting a speed for two wheelchair wheels proportional to the determined distance, determining an angle of the user touch input relative to a reference line, setting a wheel differential corresponding to the determined angle, and separately generating velocity control signals for controlling wheel speed of two major wheelchair wheels corresponding to the set speed and the set wheel differential.

5. The wheelchair control system of claim 4, wherein:

said touch pad consists of a touch screen display.

6. The wheelchair control system of claim 4, further comprising:

a two axis horizontal accelerometer detecting two axis horizontal acceleration of the wheelchair; and wherein the microcontroller is further programmed to limit the set speed if either access horizontal acceleration exceeds a respective predetermined limit.

7. The wheelchair control system of claim 4, further comprising:

a vertical accelerometer detecting a vertical acceleration of the wheelchair; and wherein the microcontroller is further programmed to stop motion of the wheelchair if the vertical horizontal acceleration exceeds a predetermined limit.

* * * * *